US009617729B2

(12) United States Patent
Sagnard et al.

(10) Patent No.: US 9,617,729 B2
(45) Date of Patent: Apr. 11, 2017

(54) FOAM WALL INSULATION SYSTEM (71) Applicant: Dow Global Technologies LLC, Midland, MI (US)

(72) Inventors: Alain Sagnard, Lachen (CH); Lars Massueger, Zurich (CH)

(73) Assignee: Dow Global Technologies LLC, Midland, MI (US)

( * ) Notice: Subject to any disclaimer, the term of this patent is extended or adjusted under 35 U.S.C. 154(b) by 144 days.

(21) Appl. No.: 14/396,859

(22) PCT Filed: May 28, 2013

(86) PCT No.: PCT/US2013/042797
§ 371 (c)(1),
(2) Date: Oct. 24, 2014

(87) PCT Pub. No.: WO2013/184425
PCT Pub. Date: Dec. 12, 2013

(65) Prior Publication Data
US 2015/0111001 A1 Apr. 23, 2015

Related U.S. Application Data
(60) Provisional application No. 61/656,541, filed on Jun. 7, 2012.

(51) Int. Cl.
*E04B 1/94* (2006.01)
*E04C 2/292* (2006.01)
(Continued)

(52) U.S. Cl.
CPC .............. *E04B 1/94* (2013.01); *B32B 5/142* (2013.01); *B32B 15/046* (2013.01); *E04B 1/762* (2013.01);
(Continued)

(58) Field of Classification Search
CPC .. E04B 1/94; E04B 1/941; E04B 1/942; E04F 13/073; E04F 13/0733; E04F 13/0736;
(Continued)

(56) References Cited

U.S. PATENT DOCUMENTS 3,479,779 A * 11/1969 Ziegler .................... E04C 2/284
428/178
3,637,459 A * 1/1972 Parish ...................... E04C 2/243
428/317.7
(Continued)

FOREIGN PATENT DOCUMENTS

CN 1862070 A * 11/2006
DE 7834813 U1 * 5/1980
(Continued)

OTHER PUBLICATIONS

Cverna, Fran. (2002). ASM Ready Reference—Thermal Properties of Metals—5. Melt Properties. ASM International. Online version available at: app.knovel.com/hotlink/pdf/id:kt0OURN5Q1/asm-ready-reference-thermal/melt-properties.*
(Continued)

*Primary Examiner* — Maria Veronica Ewald
*Assistant Examiner* — Ethan A Utt
(74) *Attorney, Agent, or Firm* — Steven W. Mork (57) ABSTRACT A wall insulation system includes a thermoplastic polymer foam board, ribs of melt barrier material extending horizontally across the width of the thermoplastic polymer foam board and a metallic facing bonded to the outside surface of the thermoplastic polymer foam board and covering the outside primary surface of the thermoplastic polymer foam board and any ribs exposed along the outside primary surface of the thermoplastic polymer foam board. A rib of melt barrier material extends across the width of the ther-
(Continued)

moplastic polymer foam board in any 50 centimeter distance along the height of the foam board.

9 Claims, 4 Drawing Sheets

(51) Int. Cl.
| | | |
|---|---|---|
| E04B 1/76 | (2006.01) | |
| B32B 15/04 | (2006.01) | |
| B32B 5/14 | (2006.01) | |
| E04F 13/08 | (2006.01) | |
| E04F 13/12 | (2006.01) | |
| E04C 2/296 | (2006.01) | |
| E04F 13/073 | (2006.01) | |

(52) U.S. Cl.
CPC .............. *E04C 2/292* (2013.01); *E04C 2/296* (2013.01); *E04F 13/0733* (2013.01); *E04F 13/0876* (2013.01); *E04F 13/0878* (2013.01); *E04F 13/12* (2013.01); *E04F 2290/045* (2013.01); *Y10T 428/24504* (2015.01)

(58) Field of Classification Search
CPC ... E04F 13/08; E04F 13/0876; E04F 13/0878; E04C 2/292; E04C 2/38; E04C 2/36
See application file for complete search history.

(56) References Cited

U.S. PATENT DOCUMENTS

| | | | | |
|---|---|---|---|---|
| 4,747,247 | A * | 5/1988 | Petersen, Jr. | ............ E04D 11/02 |
| | | | | 52/408 |
| 4,837,999 | A | 6/1989 | Stayner | |
| 6,085,479 | A * | 7/2000 | Carver | ...................... E04B 1/14 |
| | | | | 52/794.1 |
| 6,358,599 | B1 * | 3/2002 | Deibel | ..................... B32B 5/18 |
| | | | | 428/308.4 |
| 6,363,674 | B1 | 4/2002 | Carver | |
| 2005/0031844 | A1 * | 2/2005 | Wang | ....................... E04B 1/88 |
| | | | | 428/304.4 |
| 2003/0263575 | | 11/2006 | Ritchie | |
| 2006/0260268 | A1 | 11/2006 | Ritchie | |
| 2006/0265985 | A1 * | 11/2006 | Nichols | ................... E04C 2/384 |
| | | | | 52/309.8 |
| 2007/0094992 | A1 * | 5/2007 | Antonic | .................. E04C 2/384 |
| | | | | 52/656.1 |
| 2015/0140243 | A1 * | 5/2015 | Sagnard | .................... B32B 5/18 |
| | | | | 428/34.7 |
| 2015/0345691 | A1 * | 12/2015 | Sagnard | ................ F16L 59/145 |
| | | | | 428/36.5 |

FOREIGN PATENT DOCUMENTS

| | | | | |
|---|---|---|---|---|
| DE | 3110657 | A1 * | 10/1982 | ............ E04B 1/942 |
| DE | 8402799 | U1 * | 4/1984 | ........... E04D 13/165 |
| DE | 8426763 | | 12/1984 | |
| DE | 4404153 | A1 * | 8/1995 | ............ E04B 7/225 |
| EP | 1518972 | | 3/2005 | |
| FR | 2630767 | | 11/1989 | |
| FR | 2843144 | | 2/2004 | |
| GB | 997004 | A * | 6/1965 | .............. E04B 1/76 |
| GB | 2223247 | | 6/1993 | |
| WO | WO 2010123335 | A1 * | 10/2010 | ............. E04C 2/292 |

OTHER PUBLICATIONS

Machine translation (Espacenet) of DE 84 26 763 U1. Translated Jul. 2016.*
Machine translation (Espacenet) of FR 2 630 676 A1. Translated Jul. 2016.*
Machine translation (Espacenet) of DE 78 34 813 U1. Translated Dec. 6, 2016.*
Machine translation (Espacenet) of DE 31 10 657 A1. Translated Dec. 6, 2016.*
Machine translation (Espacenet) of DE 84 02 799 U1. Translated Dec. 6, 2016.*
Machine translation (Espacenet) of DE 44 04 153 A1. Translated Dec. 6, 2016.*
Machine translation (Espacenet) of FR 2 843 144 A1. Translated Aug. 2, 2016.*

* cited by examiner

FOAM WALL INSULATION SYSTEM

BACKGROUND OF THE INVENTION

Field of the Invention

The present invention relates to a thermally insulating wall system comprising thermoplastic polymeric foam.

Introduction

Effective 1 Jul. 2012, new standards shall take effect governing classifications of fire testing for building material in Europe. Prior to that date, classifications were determined by classifying the fire testing performance of individual components of a building structure. The new standards require testing of building systems containing all components together. This constitutes a paradigm shift in fire performance testing in Europe.

The new standard classifies fire test performance according to classifications under EN13501-1. Classifications for construction excluding flooring and linear pipe fall into a range of A1-F. A classification of E or F corresponds to failing the fire testing of EN13823. Classifications above (that is closer to A1 than) E correspond to increasing fire resistant performance as the classification approaches A1. To achieve a classification of D, C or B a building component (excluding flooring) must pass EN13823 testing.

Many building structures that previously passed European fire testing standards are no longer able to meet required classifications under the new standards, resulting in E or F classification under the new standard. For example building wall insulating systems that comprise thermoplastic polymer foam that may have previously passed European fire testing standards are now unable to obtain a classification above E in under EN13501-1.

It is desirable to identify a building wall thermal insulating system comprising thermoplastic polymer foam that can achieve a classification above E under EN13501-1. It is further desirable to provide such a building wall thermal insulating system that is as light weight as possible to facilitate installation. It is still further desirable to provide such building wall thermal insulating system that avoids thermal shorts through the wall so as to optimize thermal insulating properties of the wall system.

BRIEF SUMMARY OF THE INVENTION

The present invention provides a thermoplastic polymer foam-based insulation system for construction of building walls that can achieve a classification above E under the new European EN 13501-1 classification standards. The present invention further accomplishes this objective while avoiding thermal shorts through the wall and by using foamed materials to minimize weight.

The change in fire performance classification required more than optimizing flame retardant properties of each individual component of the insulating system. Rather, the present invention is a result of analyzing how entire building wall systems comprising thermoplastic polymer foam insulation behave under EN13823 testing conditions and then redesigning the building wall system as a whole to improve test performance. Without being bound by theory, the present invention addresses a possible concern that thermoplastic foam structures tend to collapse more quickly than desired under an EN13823 test conditions as the thermoplastic polymer melts and vertical channels form, vertical channels through which fire and heat can travel to accelerate decomposition of the polymer foam (chimney effect). Attempting to merely enclose the thermoplastic polymer foam more tightly from the source of flame proved counterproductive by trapping heat in with the foam and accelerating melting of the foam and the chimney effect.

The present invention provides an insulation system specifically designed to restrict flow of molten thermoplastic polymer foam insulation vertically for the length of a wall so as to form vertical channels that enable a chimney effect.

In a first aspect, the present invention is a wall insulation system comprising: (a) a thermoplastic polymer foam board having mutually perpendicular height, width and thickness dimensions and opposing inside and outside primary surfaces; (b) ribs of melt barrier material extending horizontally across the width of the thermoplastic polymer foam board, extending at through at least 75 percent of the thickness of the thermoplastic polymer foam board and extending at least 30 millimeters in the height dimension of the thermoplastic polymer foam; and (c) a metallic facing that has a thickness of at least 0.45 millimeters bonded to the outside surface of the thermoplastic polymer foam board and covering the outside primary surface, including any exposed ribs, of the thermoplastic polymer foam board; wherein there is a rib of melt barrier material extending across the width of the thermoplastic polymer foam board in any 50 centimeter distance along the height of the foam board and wherein the melt barrier material has a melting temperature of 800 degrees Celsius or higher or that decomposes instead of melting.

The present invention is useful for insulating building walls and serving as building walls. The invention is particularly desirable for insulating building walls that achieve a classification under EN13501-1 of D or higher.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

"Polymer", unless indicated otherwise, refers to both homopolymer and copolymer. Unless otherwise indicated, "copolymer" includes block copolymer, graft copolymer, alternating copolymer and random copolymer.

"Primary Surface" refers to a surface of an article having a planar surface area equal to or greater than any other surface of the article. Planar surface area is the area of a surface as projected onto a plane so as to exclude contribution from contours (peaks and valleys) in the surface.

"Vertical" refers to alignment parallel to Earth's gravitational field at the location of the article being referenced. "Horizontal" refers to alignment perpendicular to the Earth's gravitational field at the location of the article being referenced. "Vertically oriented" and "non-horizontal" are synonymous and refer to an orientation having a vertical component, preferably entirely vertical. For example anything that is not perfectly horizontal is vertically oriented.

"Height, "width" and "thickness" are mutually perpendicular dimensions of an article. "Height" refers to a dimension in the vertical direction. For sheets, boards, and other articles having opposing primary surfaces, "thickness" refers to a dimension extending perpendicular to and extending between the opposing primary surfaces and is equal to the smallest magnitude of the height, width and thickness of an article.

For the wall insulation system of the present invention, terms such as vertical, horizontal and height correspond to the wall insulation system as oriented for use on a wall and testing according to EN13823. While the system may be turned to essentially any orientation before attachment to a wall, the intent is that such an orientation is within the scope of the present invention if the system is installed, or intended for installation, and is tested for fire performance in an orientation as described herein.

The wall insulation system of the present invention comprises a thermoplastic polymer foam board; that is, a thermoplastic polymer foam in the form of a board.

Thermoplastic polymer foam comprises a thermoplastic polymer continuous phase matrix that defines multiple cells or voids defined therein. The polymer foam can be open-cell foam or closed-cell foam. An open-cell foam has an open cell content of 30 percent (%) or more, and can have an open cell content of 50% or more, 60% or more, 70% or more 80% or more, 90% or more, 95% or more and can have 100% open cell content. Closed-cell foam has an open cell content of less than 30%, and can have an open cell content of 20% or less, 10% or less, 5% or less and can have zero percent open cell content. Determine percent open cell content according to American Society for Testing and Materials (ASTM) method D6226-05. Desirably, the thermoplastic polymer foam is closed-cell foam in order to be more thermally insulating. The thermoplastic polymer foam desirably has a density of 25 kilograms per cubic meter ($kg/m^3$) or more, preferably 30 $kg/m^3$ or more and at the same time is desirably 90 $kg/m^3$ or less, preferably 60 $kg/m^3$ or less and still more preferably 40 $kg/m^3$ or less. Determine foam density according to ASTM D1622-08

Suitable thermoplastic polymers that can form the continuous phase matrix of the thermoplastic polymer foam include any one or any combination of more than one thermoplastic polymer. Olefinic polymers, alkenyl-aromatic homopolymers and copolymers comprising both olefinic and alkenyl aromatic components are suitable. Examples of suitable olefinic polymers include homopolymers and copolymers of ethylene and propylene.

Desirably, the foam core is a polymeric foam core having a polymer matrix comprising or consisting of one or more than one alkenyl-aromatic polymer. An alkenyl-aromatic polymer is a polymer containing alkenyl aromatic monomers polymerized into the polymer structure. Alkenyl-aromatic polymer can be homopolymers, copolymers or blends of homopolymers and copolymers. Alkenyl-aromatic copolymers can be random copolymers, alternating copolymers, block copolymers or any combination thereof and may be linear, branched or a mixture thereof.

Styrenic polymers are particularly desirably alkenyl-aromatic polymers. Styrenic polymers have styrene monomer polymerized in the polymer backbone and include styrene homopolymer, copolymer and blends thereof.

Examples of styrenic copolymers suitable for the present invention include copolymers of styrene with one or more of the following: acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

Styrene-acrylonitrile copolymer (SAN) is a particularly desirable alkenyl-aromatic polymer for use in the present invention because of its ease of manufacture and monomer availability. SAN copolymer can be a block copolymer or a random copolymer, and can be linear or branched. SAN has a higher heat distortion temperature than polystyrene homopolymer, which provides for foam having a higher use temperature than polystyrene homopolymer foam. Desirable embodiments of the present process employ polymer compositions that comprise, even consist of SAN. The one or more alkenyl-aromatic polymer, even the polymer composition itself may comprise or consist of a polymer blend of SAN with another polymer such as polystyrene homopolymer.

Whether the polymer composition contains only SAN, or SAN with other polymers, the acrylonitrile (AN) component of the SAN is desirably present at a concentration of one weight-percent (wt %) or more, preferably five wt % or more, more preferably ten wt % or more based on the weight of all thermoplastic polymers in the thermoplastic polymer matrix. The AN component of the SAN is desirably present at a concentration of fifty wt % or less, typically thirty wt % or less based on the weight of all thermoplastic polymers in the thermoplastic polymer matrix.

The thermoplastic polymer foam can be any type of thermoplastic polymer foam in the broadest scope of the present invention including both extruded and expanded foam, however, extruded foam is most desirable. Expanded foam, such as expanded polystyrene (EPS) foam comprises multiple foam components, such as beads or strands, of expandable foam that are generally expanded within a constraint (for example, within a mold or between constraining plates) to force the expanding foam structures together so that they fuse to one another to form a composite foam structure. Expanded foams are characterized by having a skin of polymer extending throughout the polymer foam and surrounding groups of foam cells. These skins correspond to the surfaces of the expanding foam components that contacted and fused together during expansion and molding of the resulting foam composite. The skin of polymer has a greater density and/or thickness than cell walls on average or the resulting foam structure on average. Expanded bead foam and strand foam are two types of expanded polymer foams. Expanded bead foam comprises multiple foam beads that expand and fuse together to form a foam structure having groupings of cells enclosed in shells of polymer skin corresponding to surface of the individual beads. Strand foam comprises multiple strands of expanding polymer foam that contact one another and fuse together resulting in a foam structure having grouping of cells within polymer skins that generally extend in one dimension of the resulting foam.

In contrast to expanded polymer foam, extruded polymer foams such as extruded polystyrene (XPS) foam are made by extruding and expanding a single expanding mass of polymer into polymer foam that is free of polymer skin networks having a density or thickness greater than the average cell wall or foam density that extend throughout the polymer foam and enclosing groups of cells. Extruded polymer foam expands from a single mass of polymer rather than result by fusing multiple expanding foam masses together. Each expanding mass has a relatively thick or high density skin around it. Therefore, expanded polymer foam has networks of this skin throughout the foam while extruded polymer foam only has such a skin around its outer surface.

Extruded polymer foam tends to be a better thermal insulator and more moisture resistant than expanded polymer foam. The network of relatively high density polymer skin can result in thermal shorts throughout the polymer foam, which are absent in extruded foam. Moisture can also find its way through voids along fused skins forming a network throughout expanded foam and undesirably result in both a decrease in thermal insulation and other problems associated with moisture. Therefore, extruded polymer foam can be desirable for use as the thermoplastic polymer foam of the present invention when the moisture resistance and optimal thermal insulation are of primary importance. In such a case, the thermoplastic polymer foam is most desirably closed-cell extruded polystyrene foam.

The thermoplastic polymer foam is in a form of a board, which has mutually perpendicular height, width and thickness dimensions and opposing inside and outside primary surfaces. The opposition inside and outside primary surfaces are substantially parallel to one another.

The wall insulation system further comprises ribs of melt barrier material. Herein, a "rib" refers to a strip or length. Hence, a rib of melt barrier material refers to a strip or length of rib barrier material. The ribs of melt barrier material serve at least two functions when the wall insulation system of the present invention is exposed to fire: (1) inhibits or prevents free flow of molten thermoplastic polymer foam to the fire source within the wall insulation; and (2) inhibits or prevents flames from rising within the wall insulation system, particularly in what can be described as a chimney effect where rising air drives intense flames up within a closed area. Therefore, it is desirable for the ribs of melt barrier material to remain intact for a longer period of time than the thermoplastic polymer foam board when the wall insulation system is exposed to heat and fire. Preferably the ribs of melt barrier material remain intact throughout the duration of exposure to a fire, at least during testing specified for EN13501-1 classification. In that regard, the melt barrier material either decomposes instead of melting or has a melting temperature of 800 degrees Celsius (° C.) or higher, preferably 1000° C. or higher.

In the broadest scope of the invention, the melt barrier material can be made of, for example, any one or combination of materials selected from polymer, metal or mineral. At the same time, the melt barrier material can be solid, fibrous or cellular. Desirably, the barrier material is foam (that is, a cellular material having a continuous matrix of material defining a plurality of cells therein) that is made from polymer, metal, mineral or any combination thereof. The melt barrier material is desirably foam in order to minimize the weight of the insulating system and to achieve the highest possible thermal resistance across the wall insulation system. In particular, the melt barrier material is desirably a foam form of a material that is a poor thermal insulating material such as a polymeric foam, glass foam or mineral (such as silica) foam in order to maximize thermal resistance. For example, one desirable melt barrier material is selected from polyisocyanurate foam of phenolic foam, foamed glass or silicate foam such as an aerogel. The melt barrier material can be free from mineral fibers such as mineral wool (such as rockwool or stonewool), metal, or both mineral fibers and metal.

Desirably, the melt barrier material is a polymeric foam, such as a polyisocyanurate foam, that has an open cell content of less than 30 percent (%), preferably less than 20%, more preferably 10% or less, still more preferably 5% or less and most preferably 2% or less as determined by ASTM D6226-05 in order to optimize thermal insulating properties through the melt barrier material. In order to keep the weight of the wall insulation system to a minimum, it is also desirable for the melt barrier material to have a density of 50 kilograms per cubic meter ($kg/m^3$) or less, preferably 45 $kg/m^3$ or less, and can be 40 $kg/m^3$ or less. At the same time, is it desirable for the melt barrier material to have a density of 30 $kg/m^3$ or more, more desirably 35 $kg/m^3$ or more and can be 40 $kg/m^3$ or more or even 45 $kg/m^3$ or more in order to optimize structural integrity when exposed to flames. Determine foam density according to ASTM D1622-08.

The ribs of melt barrier material extend horizontally across the width of the thermoplastic polymer foam board. Typically, ribs of melt barrier material reside between individual thermoplastic polymer foam boards, but can extend within an individual thermoplastic polymer foam board. "Extending across the width of the thermoplastic polymer foam board" means across at least 75 percent (%), preferably 80% or more, more preferably 90% or more of the width of the thermoplastic polymer foam board. Desirably, the ribs of melt barrier material extend entirely across the width of the thermoplastic polymer foam board. The ribs of melt barrier material can extend continuously or discontinuously across the width of the thermoplastic polymer foam board. That is, provided that a rib of melt barrier material resides across the width of a foam board it may extend as a single rib or as multiple ribs spaced next to one another or remote from one another provided that in their aggregate the multiple ribs extending across a thermoplastic polymer foam board span the specified width across the thermoplastic polymer foam board.

The ribs of melt barrier material extend at least 75 percent (%), preferably 80% or more, more preferably 90% or more of the thickness of the thermoplastic polymer foam board. The ribs of melt barrier material can extend entirely through the thickness of the thermoplastic polymer foam board.

Each rib of melt barrier material extends at least 30 millimeters (mm) and preferably extends at least 50 mm, and can extend 75 mm or more and even 100 mm or more in the height dimension of the thermoplastic polymer foam board (the dimension extending vertically). At the same time, each rib of melt barrier material generally extends 300 mm or less, preferably 100 mm or less and can extend 75 mm or less in the height dimension of the thermoplastic polymer foam board.

There is a rib across the width of the thermoplastic polymer foam board in any 50 centimeter distance along the height of the foam board. The spacing between ribs of melt barrier material in the height dimension of the thermoplastic polymer foam board as measured center-to-center is desirably 50 centimeters or less and can be 40 centimeters or less, even 30 centimeters or less. The wall insulation system can comprise a rib of melt barrier material at the top and not the bottom, at the bottom and not the top, at both the top and the bottom, or neither the top nor bottom of the wall insulation system. "Top" refers to the highest edge of the wall insulation system. "Bottom" refers to the lowest edge of the wall insulation system.

The ribs of melt barrier material can be bound to the thermoplastic polymer foam board or boards across which the ribs extend. Alternatively the ribs can be unattached and remain fixedly independent from the thermoplastic polymer foam board or boards across which they extend.

The thermoplastic polymer foam board of the present invention can actually comprise multiple individual thermoplastic polymer foam boards arranged together into a single compilation, particularly when installed onto a wall. Ribs of melt barrier material can reside within individual thermoplastic foam boards, between individual thermoplastic foam boards, or both between individual thermoplastic polymer foam boards and within individual thermoplastic foam boards. Ribs of melt barrier material abut the foam board or boards adjacent to the rib. Ribs of melt barrier material can be adhered to or be independent from (that is, free from adhesion to) thermoplastic polymer foam to which they abut.

The wall insulation system further comprises a metallic facing covering the outside primary surface, including any exposed ribs, of the thermoplastic polymer foam board. If the thermoplastic polymer foam board comprises a compilation of multiple thermoplastic polymer foam boards the metallic facing covers the outside primary surface of the thermoplastic polymer foam boards and any ribs in or between the compilation of thermoplastic polymer foam boards. The metallic facing is desirably made of aluminum (for example, aluminum sheet), though it can be made of any metal in the broadest scope of the present invention. The metallic facing has a thickness of at least 0.45 millimeters and can have a thickness of 0.5 millimeters or more, 0.75 millimeters or more, 1.0 millimeters or more, even 1.5 millimeters or more. At the same time, the metallic facing generally has a thickness of three millimeters or less, and can have a thickness of two millimeters or less, one millimeter or less, 0.75 millimeters or less and even 0.5 millimeters or less.

The metallic facing material is bonded to the thermoplastic polymer foam board. Desirably, the metallic facing material is bonded to the outside surface of the thermoplastic polymer foam board using an adhesive. Suitable adhesives include epoxy adhesives and polyurethane adhesives.

It is desirably for the metallic facing material to be shaped so as to define a space or channel that extends primarily horizontally between the metallic facing material and thermoplastic polymer foam board and/or one or more than one of melt barrier materials. "Primarily horizontally" means within 30 degrees, preferably within 15 degrees, more preferably within five degrees of horizontal and most preferably horizontal. Such a space or channel can collect molten polymer foam and prevent the molten polymer foam from flowing towards a lower head source and serves as fuel for a fire.

The metallic facing material is desirably spaced apart from and preferably free from contact with the ribs of melt barrier material so that if the ribs expand upon heating the expanded ribs will not push out or deform the metallic facing material. Desirably, there is a spacing of 0.5 millimeters (mm) or more, preferably one mm or more, still more preferably two mm or more, yet more preferably three mm or more between the ribs and the metallic facing material. At the same time, the spacing is generally 20 mm or less, typically 10 mm or less and can be five mm or less between the ribs and metallic facing material.

It is conceivable and within the broadest scope of the present invention to prepare and provide components and even entire wall systems that comprise as a single unit thermoplastic foam boards having ribs of melt barrier material extending within them and a metallic facer spanning a primary face of the thermoplastic foam boards.

Metallic facing material can be provided as a laminate to the thermoplastic polymer foam boards prior to assembling the system with the ribs of melt barrier material. To facilitate assembly in such an embodiment, the metallic facing material generally extends beyond a primary surface of the thermoplastic polymer foam to which it is laminated so as to form a flap of metallic facing material. Upon installation of the wall insulation system comprising such a flap of metallic facing material, the flap of metallic facing material is placed over a rib of melt barrier material abutting the polymeric foam board proximate to the flap and overlaps a metallic facing material laminated to a subsequent polymeric foam board. Desirably, the flap attaches to the metallic facing material that it overlaps. The flap can mechanically fasten to or through the metallic facing material that it overlaps using, for example, rivets or screws. Rivets and/or screws can extend through the flap and into or through the metallic facing material the flap overlaps and can further extend into the thermoplastic polymer foam that the overlapped metallic facing covers. Use of rivets and/or screws is a desirable method for attaching the metallic facers together. Optionally, the flap is further fastened to the metallic facing material that it overlaps by, for example, an adhesive such as an epoxy adhesive between the flap and metallic facing that the flap overlaps.

The metallic facing material can be flat, such as with a sheet. Alternatively, the metallic facing material can have a non-flat shape such as a clapboard configuration or any other conceivable shape desirable or useful for exterior metal claddings in the building industry. If the metallic facing material has a non-flat shape it is possible that the thermoplastic polymer foam conform to the non-flat shape of the metallic facing to avoid air gaps between the metallic facing and the thermoplastic polymer foam.

The wall insulation system of the present invention can be used as a wall insulation system for corners, particularly inside corners, which is also within the scope of the present invention. In a corner, two wall insulation systems as described herein can abut one another in a corner where the wall changes direction. In such an embodiment it is desirable for the ribs of melt barrier material in abutting walls to be aligned so as to form a continuous rib from one wall of the corner to the other wall forming the corner.

In a preferred embodiment, the wall insulation system for corners comprises a column of melt barrier material extending vertically along a corner with two wall insulation systems as described herein mutually abutting the column of melt barrier material, and with the column of melt barrier material extending the full height of at least one of the abutting wall insulation systems. The wall insulation systems abutting the column of melt barrier material can be adhered to the melt barrier material or be independent from the melt barrier material. The column of melt barrier material serves to prevent a chimney effect from occurring in the corner of the wall, which for inside corners is a location where the chimney effect can be most severe.

To form a corner having a column of melt barrier material, the two wall insulation systems that abut the column of melt barrier material form an angle of other than 180 degrees with respect to one another (as measured horizontally across a primary surface of the wall insulation systems). The wall insulation system for corners desirably form an angle of 135 degrees or less, 120 degrees or less, 100 degrees or less and can be 90 degrees or less as determined from the smallest angle as measured horizontally across a primary surface, preferably the outside primary surface, of the wall insulation systems (that is, the primary surface comprising the metallic facing. At the same time, the wall insulation system for corners desirably form an angle of 30 degrees or more and preferably 45 degrees or more as measured horizontally across a primary surface, preferably the outside primary surface, of the wall insulation systems. For avoidance of doubt, the outside primary surface of the wall insulation system is the primary surface most proximate to the outside primary surface of the thermoplastic polymer foam board of the wall insulation system.

The wall insulation system of the present invention can be attached to a building wall support structure to serve as at least part of an insulated wall of a building. For installation onto a wall support structure, the inside primary surface of the wall insulation system (or thermoplastic polymer foam board) is mounted most proximate to (for example, directly against) the wall support structure as compared to the outside primary surface of the wall insulation system (or thermoplastic polymer foam board).

Any wall support structure is suitable for the broadest scope of the present invention. For example, the wall insulation system of the present invention can be attached over existing building walls of any type including over masonry block wall, poured cement, wooden wall structures, and metal wall structures. One example of a suitable wall support structures include "stick" structures comprising a series of studs spaced apart from one another and attached to a header (or top-plate) and footer (or bottom-plate). Within this example, the wall insulation system can be attached directly to the series of studs. Alternatively, a sheathing material (for example plywood or oriented strand-board) can cover the series of studs and the wall insulation system can be attached to the sheathing material. The wall insulation system can be attached to the wall support structure in any way suitable for the building industry including, as examples, using one or any combination of more than one of the following: chemical adhesives and mechanical fasteners such as nails, screws, staples, rivets.

EXAMPLES

Figure 1:
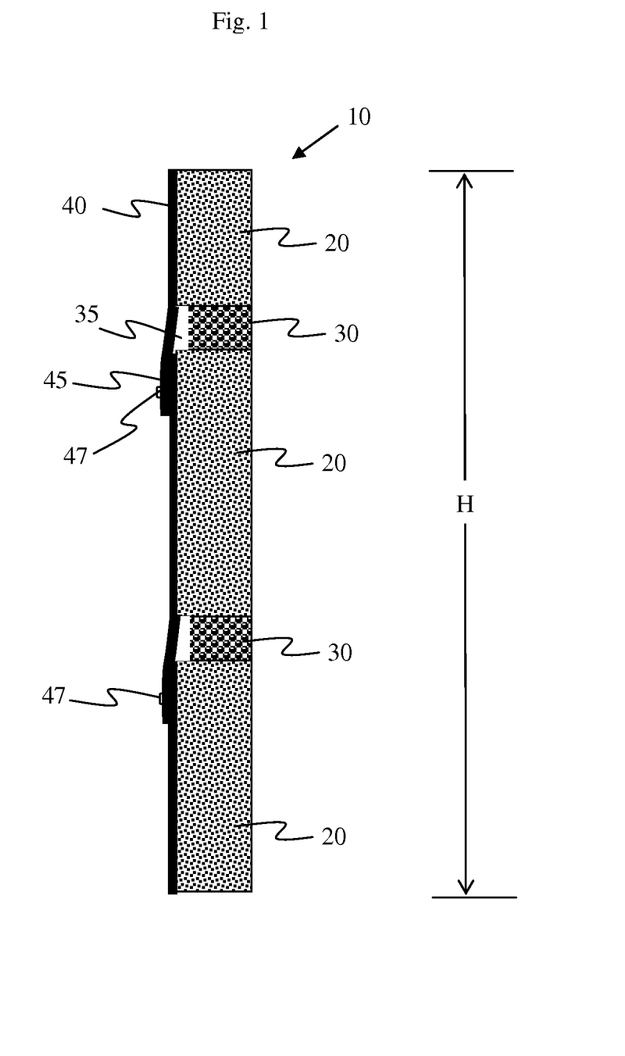
FIG. 1 illustrates a side-view of a thermally insulating wall system of the present invention.

FIG. 1 illustrates (not to scale) a wall insulation system of the present invention (Example 1) as viewed end-on showing the height and thickness dimensions of the wall insulation system and components. Wall insulation system 10 comprises thermoplastic polymer foam boards 20, ribs of melt barrier material 30 and metallic facing 40. Thermoplastic polymer foam boards 20 are extruded polystyrene foam boards having a density between 35 and 40 kg/m$^3$ and a thickness of 80 millimeters (for example, STYROFOAM™ LB-X brand extruded polystyrene foam, STYROFOAM is a trademark of The Dow Chemical Company). Ribs of melt barrier material 30 are closed-cell polyisocyanurate foam having a density of 45 kg/m$^3$ (for example, TARECPIR™ M1-CR brand foam, TARCPIR is a trademark of Kingspan Tarec). The ribs of melt barrier material have a thickness and height of 80 millimeters and extend the full width of the thermoplastic polymer foam. Metallic facing 40 is a flat aluminum sheet having a thickness of 0.45 millimeters. Metallic facing 40 is adhered to thermoplastic polymer foam boards 20 using a polyurethane adhesive (not shown). Metallic facing 40 includes flap 45 that extends off from the bottom of thermoplastic polymer foam boards 20, spans an adjoining rib of melt barrier material 30 and overlaps metallic facing 40 of the subsequent thermoplastic polymer foam board 20. Flap 45 is adhered to metallic facing 40 of a subsequent thermoplastic polymer foam board 20 by rivets 47 extending along flap 45. The spacing between ribs of melt barrier material 30 along the height dimension H of wall insulation system 10 is approximately 450 millimeters. Ribs of melt barrier material 30 have a thickness less than that of thermoplastic polymer foam boards 20 resulting in a space 35 between metallic facing 40 and ribs of melt barrier material 30.

Based on prior testing results, wall insulation system 10 is expected to achieve a D or better classification under EN13501-1 ratings based on prior testing results.

In comparison, a wall insulation system according to FIG. 1 except without melt barrier material 30 is expected to achieve an E or lower rating according to EN13501-1.

Figure 2:
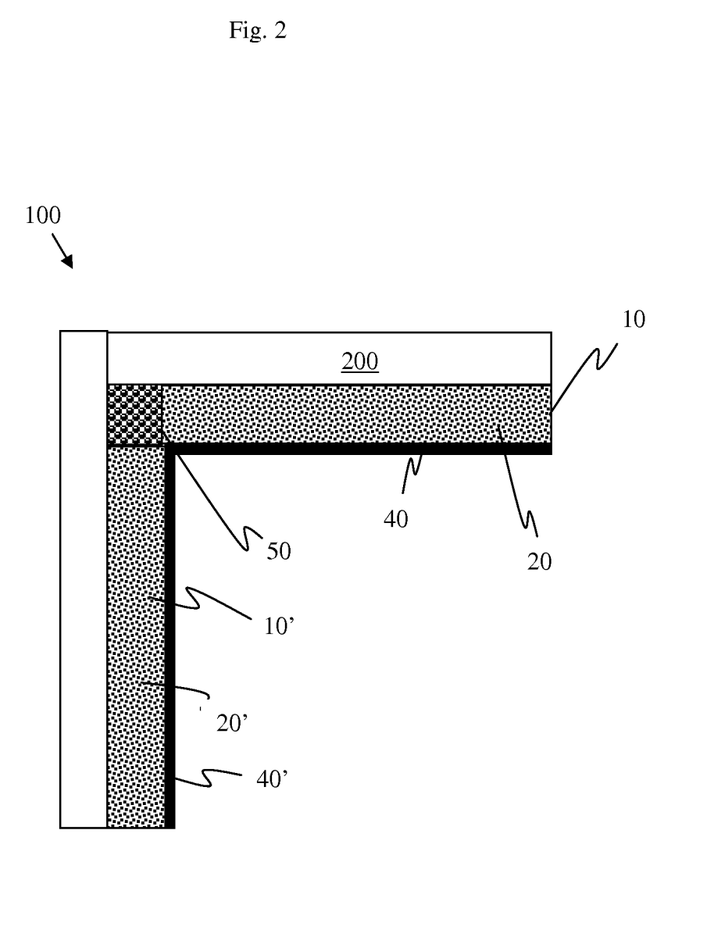
FIG. 2 illustrates a top-view of a thermally insulating wall system of the present invention that forms and inside corner, including a support structure to which the thermally insulating wall system is attached.

FIG. 2 illustrates (not to scale) a wall insulation system of the present invention (Example 2) in the form of an inside corner as from the top of the wall insulation system. Inside corner wall insulation system 100 comprises wall insulation systems 10 and 10', both as described for FIG. 1, abutting column of melt barrier material 50, made of the same material as ribs of melt barrier material 30. The column of melt barrier material extends the full height of corner wall insulation system 100 and has a thickness and width of 90 millimeters. Included in FIG. 2 is wall support structure 200 (of which only a top plate is visible) to which inside corner wall insulation system 100 is attached. Wall insulation systems 10 and 10' comprise thermoplastic polymer foam boards 20 and 20', respectively as well as metallic facings 40 and 40', respectively. Melt barrier ribs are not apparent in FIG. 2 since they run horizontally and are blocked from view by thermoplastic polymer foam boards 20 and 20'.

Based on prior testing results, inside corner wall insulation system 100 is expected to achieve a D or better classification under EN13501-1 ratings.

Example 3

Figure 3:
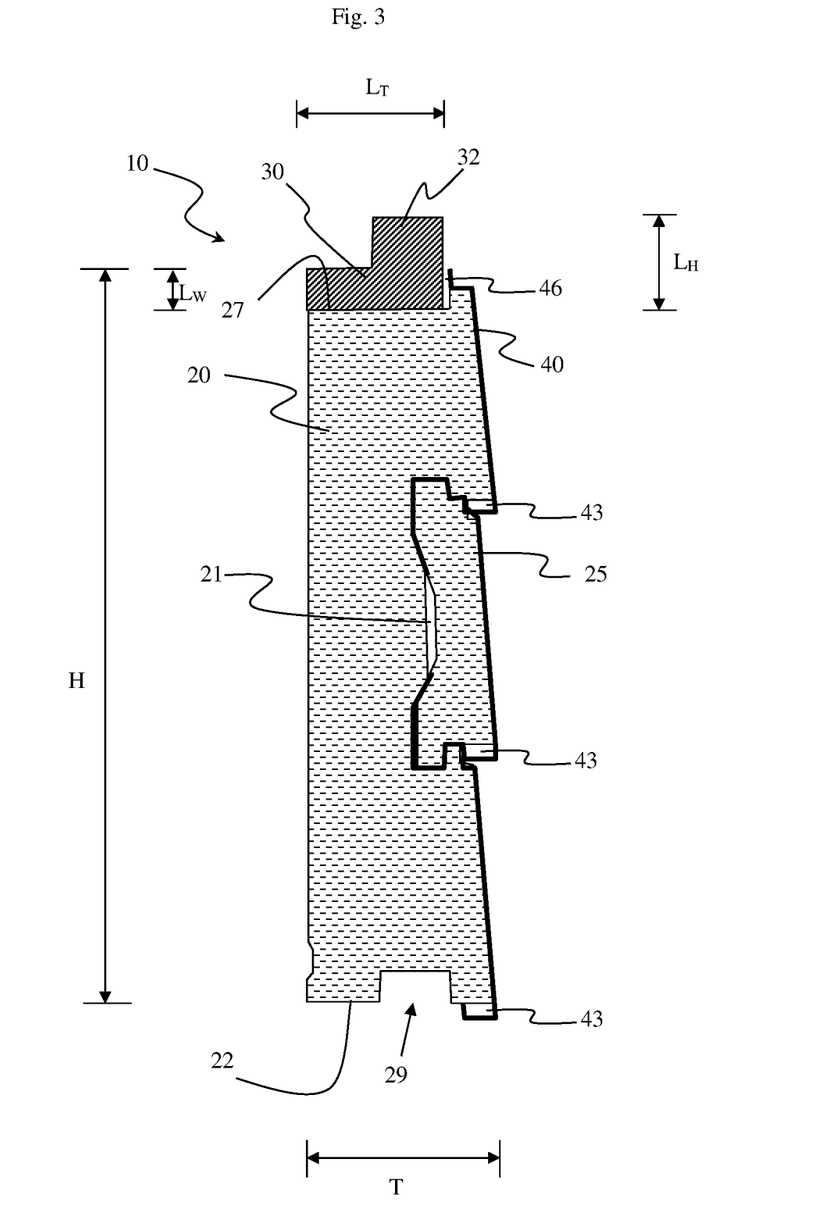
FIG. 3 illustrates a side-view of a thermally insulating wall system of the present invention.

FIG. 3 illustrates (not to scale) a side-on view of the height and thickness dimensions of a wall insulation system 10 (Example 3) that is in the form of a single unit that is combinable with similar wall systems 10 units to cover an wall. Wall insulation system 10 comprises thermoplastic polymer foam boards 20 that are molded into a shape that defines slot 21 that receives thermoplastic polymer foam board piece 25. When piece 25 is inserted into board 20 the contour of the assembly resembles and assembly of lap siding. Ends 22 and 27 of board 20 further is contoured to so that end 22 receives an "L" shaped rib of melt barrier material 30 positioned so that 32 leg of rib 30 extends up beyond foam board 20. End 27 is shaped so as to receive leg 32 into groove 29 when multiple units of wall system 10 are positioned above one another to insulate a wall. Board 20 has a height H of 406 millimeters (mm) and thickness T of 80 millimeters at its thickest point. Metallic facing 40 extends over a surface of board 20 and board piece 25 conforming to the lap siding contour of board 20 and piece 25. Metallic facing 40 is shaped so that it extends beyond foam board 20 and piece 25 to form channels 43 extending horizontally along wall insulation system 10 at locations corresponding to what would appear to be bottoms of laps in the siding contour. Metallic facing 40 further extends up partially over rib 30 without touching rib 30, leaving space 46 between metallic facing 40 and rib 30. Metallic facing 40 extend over rib 30 a sufficient distance so as to be overlapped by channel 44 of a second unit of wall insulation 10 positioned over rib 30.

Thermoplastic foam boards 20 are STYROFOAM™ LB brand extruded polystyrene foam insulation having a density of approximately 35 kilograms per cubic meter.

Rib 30 is a closed-cell polyisocyanurate foam having a density of 45 kilograms per cubic meter (TARCPI M1-CR 45 brand foam available from Kingspan Tarec Industrial Insulation). Rib 30 has leg height $L_H$ of 40 mm, leg width $L_W$ of 20 mm and leg thickness $L_T$ of 55 mm Metallic facing 40 is aluminum having a thickness of 0.8 mm. Metallic facing 40 is glued to foam board 20 and piece 25 using a two component polyurethane adhesive.

Example 4

Figure 4:
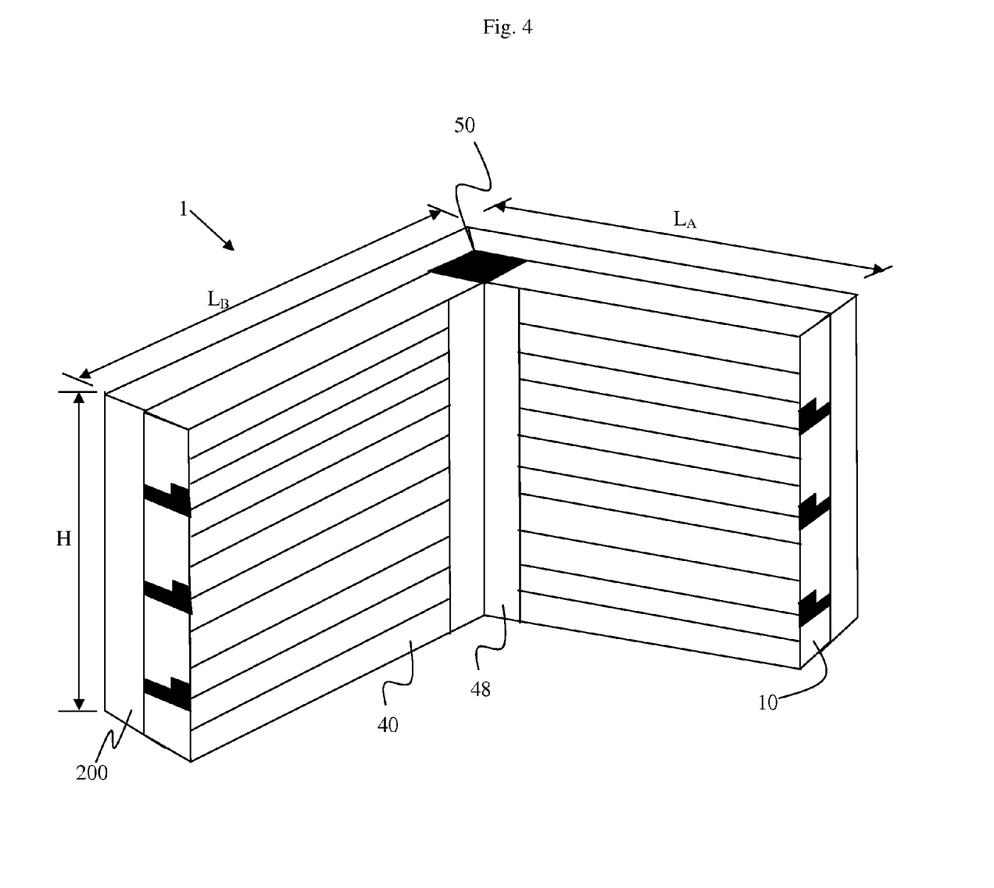
FIG. 4 illustrates an insulated wall assembly comprising multiple thermally insulating wall systems of FIG. 3 assembled to form an inside corner.

FIG. 4 illustrates (not to scale) a view of inside corner wall assembly 1 (Example 4) comprising multiple insulation wall systems 10 of Example 3 assembled on top of one another along each wall support structure 200. The insulation wall systems 10 abut column of melt barrier material 50 in the corner of wall assembly 1. Column 50 is 90 mm by 90 mm square in cross section and extends the full height of the wall assembly. Wall assembly 1 has a height H of 1500 mm, leg A length $L_A$ of 495 mm and leg B length $L_B$ of 1000 mm. The metallic facing 40 of the insulation wall systems 10 is exposed on the inside corner surface. Inside corner facing 48 extends the height of wall assembly 1 and over metallic facing 40 of the insulation wall systems 10 that abut column 50 and extend for a distance of approximately 80 mm along each of leg $L_A$ and $L_B$. Inside corner facing 48 is screwed or riveted to metallic facing 40 on each of leg $L_A$ and $L_B$.

Wall support structure 200 is a wooden frame as a defined by the norm EN13823.

Column 50 is the same closed-cell polyisocyanurate foam as ribs 30.

Example 4 surprisingly achieves a classification of B-s1-d0 according to EN13501-1. Specific burn properties for Example 4 under EN13823 testing are reported in Table 1.

Comparative Example A

Prepare a Comparative Example A in like manner as Example 4 except instead of using thermally insulating panels 30 as described in Example 3, use insulating panels that have no ribs of melt barrier material 30. Instead, use thermoplastic polymer boards that have an extra length to them so that end 27 has thermoplastic polymer foam board cut into the shape of what would correspond to rib of melt barrier material 30. In that way, the melt barrier material of Example 3 has been replaced with thermoplastic polymer foam board. The resulting structure appears similar to Example 3 and, when a test all is assembled, similar to Example 4 except there is no melt barrier material present as either ribs or in the form of the come column.

Comparative Example A achieves only a classification of E s3 d2 under EN13501. Specific burn properties for Comparative Example A under EN13823 testing are reported in Table 1.

TABLE 1

| Burn Properties per EN13823 | Comparative Example A | Example 4 |
| --- | --- | --- |
| FIGRA 0.5 MJ (Watt per second) | 859.30 | 0.55 |
| THR600 (Mega Joules) | 17.00 | 0.60 |
| SMOGRA (square meters per second per second) | 79.00 | 2.15 |
| TSP600 (square meters) | 521.90 | 41.50 |
| SBI Classification under EN13501-1 | E s3 d2 | B s1 d0 |

The results of Table 1 illustrate the benefit of the structure of the present invention. The ribs of melt barrier material have resulted in a significant improvement in EN13501-1 classification.

The invention claimed is:

1. A wall insulation system comprising:
   a. a thermoplastic polymer foam board having mutually perpendicular height, width and thickness dimensions and opposing inside and outside primary surfaces;
   b. ribs of melt barrier material extending horizontally across the width of the thermoplastic polymer foam board, extending through at least 75 percent of the thickness of the thermoplastic polymer foam board and extending at least 30 millimeters in the height dimension of the thermoplastic polymer foam; and
   c. a metallic facing that has a thickness of at least 0.45 millimeters bonded to the outside surface of the thermoplastic polymer foam board and covering the outside primary surface, including any ribs of barrier material along the outside primary surface, of the thermoplastic polymer foam board;

wherein there is a rib of melt barrier material extending across the width of the thermoplastic polymer foam board in any 50 centimeter distance along the height of the foam board and wherein the melt barrier material has a melting temperature of 800 degrees Celsius or higher or that decomposes instead of melting and wherein the metallic facing is spaced apart from and free from contact with the ribs of melt barrier material so that the ribs can expand without pushing out or deforming the metallic facing material.

2. The wall insulation system of claim 1, wherein the thermoplastic polymer foam board is closed-cell extruded polystyrene foam.

3. The wall insulation system of claim 1, wherein the melt barrier material is foam.

4. The wall insulation system of claim 1, wherein the melt barrier material is a foam selected from foamed glass, foamed mineral, and polyisocyanurate foam.

5. The wall insulation system of claim 1, wherein the melt barrier material has a density of at least 35 kilograms per cubic meter as determined by ASTM D1622-08.

6. The wall insulation system of claim 1, wherein the ribs of melt barrier material have a greater height proximate to the outside surface of the thermoplastic polymer foam board than proximate to the inside surface of the thermoplastic polymer foam board.

7. The wall insulation system of claim 1, wherein the metallic facing is aluminum.

8. The wall insulation system of claim 1, further characterized as being mounted onto a wall support structure with the inside primary surface of the thermoplastic polymer foam board most proximate to the wall support structure as compared to the outside primary surface of the thermoplastic polymer foam board.

9. A system comprising a first wall insulation system and a second wall insulation system wherein both the first and second wall insulation systems comprise:
   a. a thermoplastic polymer foam board having mutually perpendicular height, width and thickness dimensions and opposing inside and outside primary surfaces;
   b. ribs of melt barrier material extending horizontally across the width of the thermoplastic polymer foam board, extending through at least 75 percent of the thickness of the thermoplastic polymer foam board and extending at least 30 millimeters in the height dimension of the thermoplastic polymer foam; and
   c. a metallic facing that has a thickness of at least 0.45 millimeters bonded to the outside surface of the thermoplastic polymer foam board and covering the outside primary surface, including any ribs of barrier material along the outside primary surface, of the thermoplastic polymer foam board;

wherein there is a rib of melt barrier material extending across the width of the thermoplastic polymer foam board in any 50 centimeter distance along the height of the foam board and wherein the melt barrier material has a melting temperature of 800 degrees Celsius or higher or that decomposes instead of melting and wherein the metallic facing is spaced apart from and free from contact with the ribs of melt barrier material so that ribs can expand without pushing out or deforming the metallic facing material; and wherein the first and second wall insulation systems each abut a column of the melt barrier material, the column extending along the full height of at least one of the abutting first and second wall insulation systems.

* * * * *